UNITED STATES PATENT OFFICE.

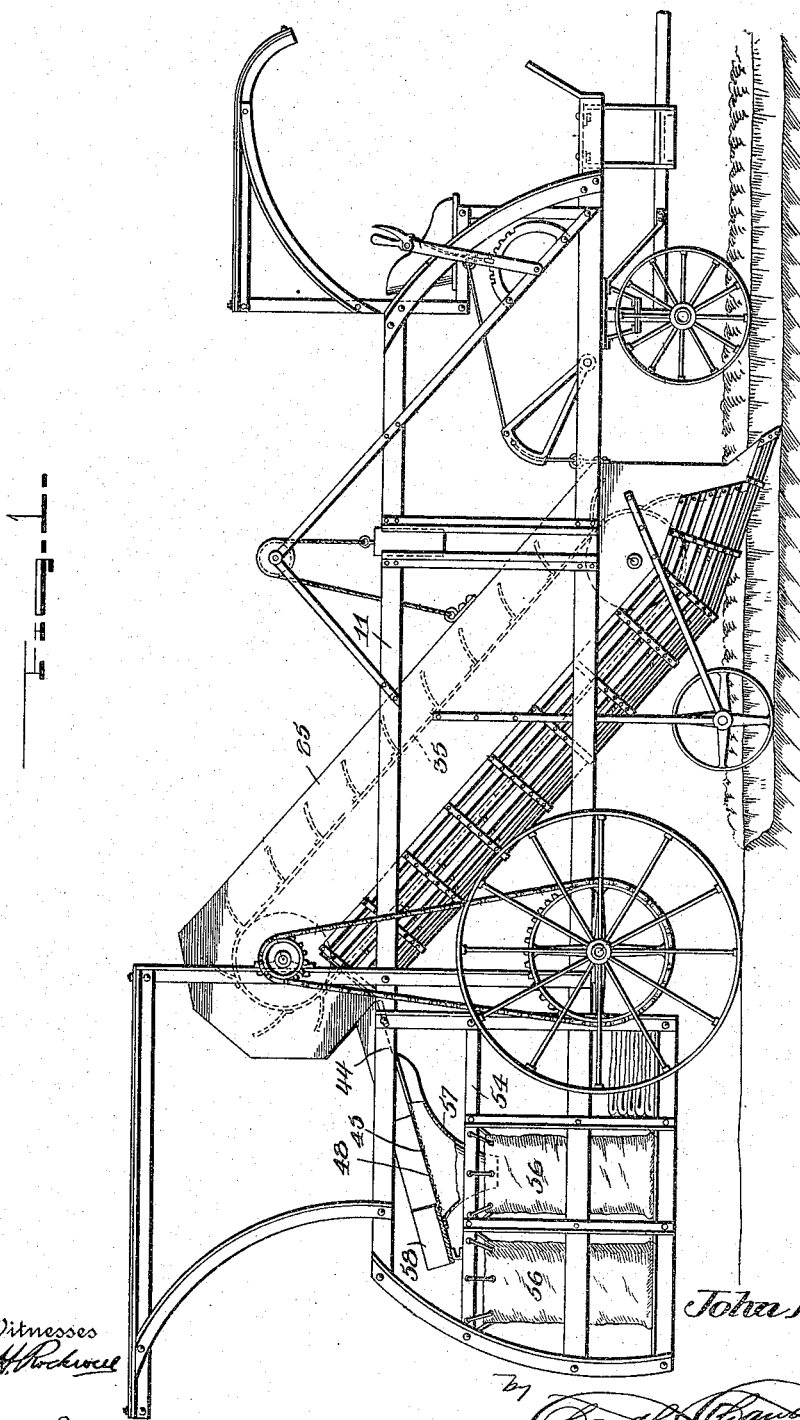

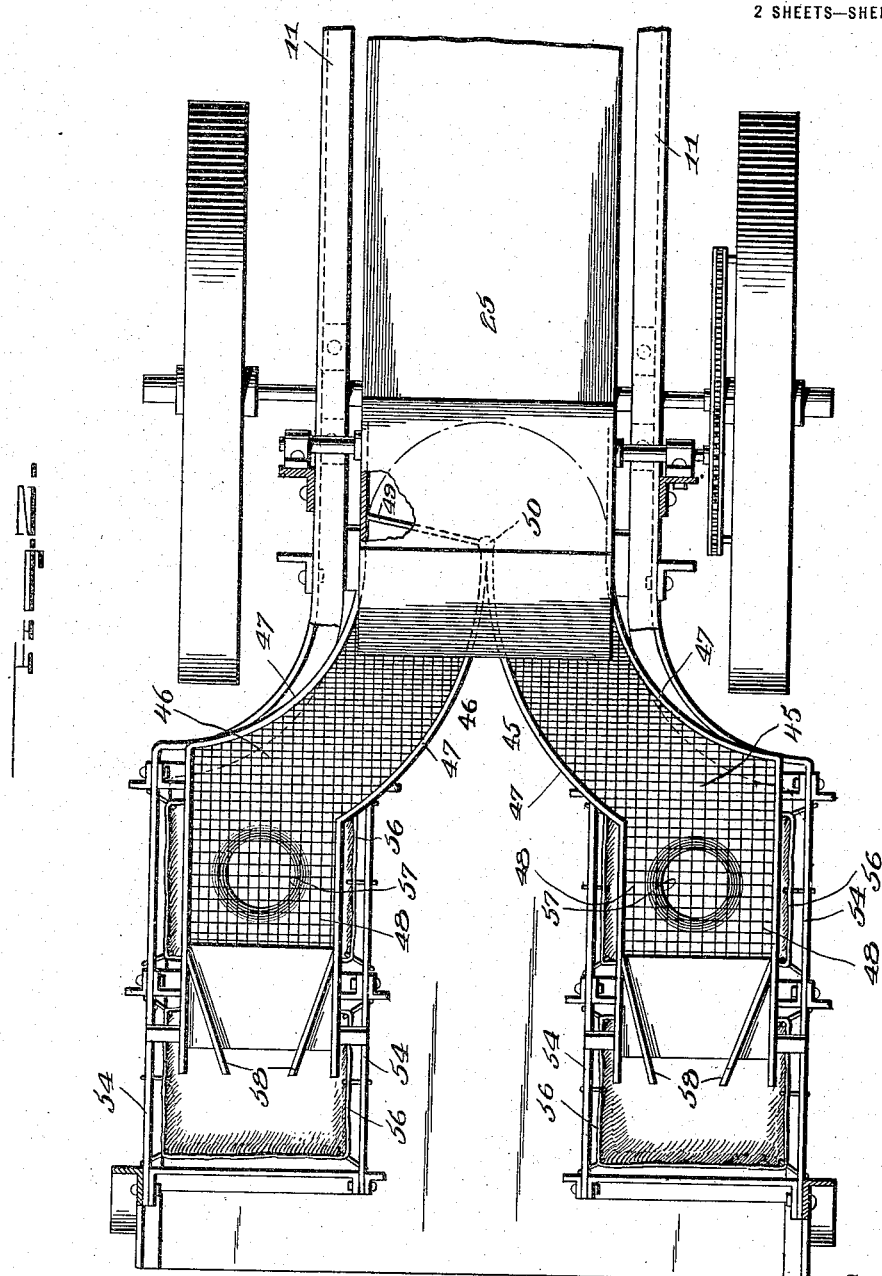

JOHN H. GREEN, OF KREMMLING, COLORADO.

POTATO-SORTER.

1,174,711.　　　　Specification of Letters Patent.　　Patented Mar. 7, 1916.

Application filed April 25, 1911. Serial No. 623,248.

*To all whom it may concern:*

Be it known that I, JOHN H. GREEN, a citizen of the United States, residing at Kremmling, in the county of Grand, State of Colorado, have invented certain new and useful Improvements in Potato-Sorters; and I do hereby declare the following to be a full, clear, and exact description of the invention, such as will enable others skilled in the art to which it appertains to make and use the same.

The present invention is directed to improvements in devices for bagging potatoes or similar vegetables, and has for its object to so construct a device of this character, which is adapted to be used in connection with a harvester, that the bags will be successively filled.

With this and other objects in view such as will appear as my description progresses, my invention comprises the combination and arrangement of parts as set forth in and falling within the scope of the appended claim.

In the drawing: Figure 1 is a side view of my device showing the same attached to a harvester; and Fig. 2 is a plan view of the device, attached to a harvester.

Referring to the drawing by reference characters wherein like parts are indicated by like characters throughout the several views, in the embodiment of the invention shown in the drawing, I have illustrated a delivery board 44 which is secured to the top sills 11 of the harvester and underlies the discharge end of an endless conveyer 35 which is located in a housing 25, the conveyer and housing being represented conventionally. To the lower edge of this board are secured the upper ends of screen members 45 and 46 which form raceways. These screen members curve outwardly from each other and thence continue parallel with each other as shown in Fig. 2, and are formed of such mesh as to permit the smaller or seed potatoes to drop therethrough and the larger or marketable potatoes to pass the entire lengths thereof to suitable receptacles. These screen members may be formed in any preferred manner, but are preferably each constructed of curved side boards 47 to the lower edges of which are connected the marginal edges of wire mesh elements 48. The delivery end of each screen member is expanded, and this delivery end is preferably rectangular in formation, the width of this rectangular portion being greater than the width of the curved portion. By this construction the entire volume of the potatoes may settle and the potatoes shift laterally relatively to each other near the discharge end of the screen members so that the volume of potatoes will be spread over a greater area and consequently the dropping of the seed potatoes through the screen members will be promoted. A suitable valve 49 is hinged on the delivery board 44 at 50 and is so arranged that it will direct the potatoes on to either of the screen members. At the lower ends of these screen members which form the raceways for the potatoes converging guides 58 are provided which direct the potatoes to suitable receptacles such as bags, indicated by the reference character 56 in the drawing. The raceways are supported on suitable frames 54 as illustrated in the drawing. Located beneath each of the raceways is a funnel 57 which is so located that it will extend into the bag 56 which is located beneath it and thus convey the smaller or seed potatoes to the bag.

From the foregoing description it will be seen that I have provided a device for bagging potatoes which may be embodied in a potato harvester and have so constructed the device that the seed potatoes will be effectively separated from the larger potatoes.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:

In a vegetable harvester, the combination with a delivery board, of downwardly inclined raceways leading from the delivery board, screen members forming the bottoms of said raceways, each raceway including an outwardly curved portion merging at its lower end into a straight and relatively wider portion and a funnel located beneath the straight portion.

In testimony whereof, I affix my signature, in presence of two witnesses.

JOHN H. GREEN.

Witnesses:
W. H. HARRISON,
J. H. THOMPSON.

Copies of this patent may be obtained for five cents each, by addressing the "Commissioner of Patents, Washington, D. C."